United States Patent
Troha et al.

(10) Patent No.: US 7,422,225 B2
(45) Date of Patent: Sep. 9, 2008

(54) TRAILER APPARATUS AND ASSEMBLY FOR TRANSPORTATION OF WHEELED VEHICLES

(75) Inventors: Dennis M. Troha, Kenosha, WI (US); Charles Tinker, Kenosha, WI (US)

(73) Assignee: ATC Leasing Company LLC, Kenosha, WI (US)

(*) Notice: Subject to any disclaimer, the term of this patent is extended or adjusted under 35 U.S.C. 154(b) by 0 days.

(21) Appl. No.: 10/463,397

(22) Filed: Jun. 17, 2003

(65) Prior Publication Data

US 2004/0052602 A1    Mar. 18, 2004

Related U.S. Application Data

(63) Continuation of application No. 09/743,557, filed on May 11, 2001, now abandoned, and a continuation of application No. PCT/US99/15523, filed on Jul. 9, 1999, which is a continuation-in-part of application No. 09/113,804, filed on Jul. 9, 1998, now abandoned.

(51) Int. Cl.
*B60P 3/08* (2006.01)

(52) U.S. Cl. .......... 280/403; 280/423.1; 410/6; 410/9; 410/24; 410/24.1; 410/56

(58) Field of Classification Search .......... 280/400, 280/401, 404, 407.1, 408, 423.1, 441.2, 417.1, 280/789, 476.1, 403; 410/3–11, 13, 16, 19, 410/23, 30, 24, 24.1, 26, 27, 56; 414/345, 414/346, 382, 381, 386, 482, 575
See application file for complete search history.

(56) References Cited

U.S. PATENT DOCUMENTS

| | | | |
|---|---|---|---|
| 2,684,264 A * | 7/1954 | Demos | 410/24.1 |
| 3,084,970 A | 4/1963 | Day | |
| 3,104,127 A | 9/1963 | Swartzwelder | |
| 3,242,880 A * | 3/1966 | Boone | 410/24 |
| 3,305,114 A * | 2/1967 | Bellingher | 414/537 |
| 3,343,865 A | 9/1967 | Stuart | |
| 3,580,627 A | 5/1971 | Underwood | |
| 3,589,767 A * | 6/1971 | Stuart | 410/24.1 |
| 3,993,342 A | 11/1976 | Jones et al. | |
| 4,172,612 A | 10/1979 | Kinard | |
| 4,262,923 A | 4/1981 | Weir | |
| 4,296,941 A | 10/1981 | Van Wassenhove | |
| 4,369,008 A | 1/1983 | Cooper | |
| 4,372,727 A * | 2/1983 | Fredrickson et al. | 414/537 |
| 4,867,468 A | 9/1989 | Paul et al. | |
| 4,943,078 A | 7/1990 | McGhie et al. | |
| 4,949,985 A | 8/1990 | Lichter | |
| 5,326,123 A | 7/1994 | Guest et al. | |
| 5,407,221 A | 4/1995 | Haire et al. | |
| 5,527,138 A | 6/1996 | Flores et al. | |
| 5,722,677 A | 3/1998 | Llichter et al. | |
| 5,755,540 A * | 5/1998 | Bushnell | 410/29.1 |
| 5,794,960 A | 8/1998 | Sill et al. | |
| 5,822,677 A | 10/1998 | Peyrovian | |

\* cited by examiner

*Primary Examiner*—Anne Marie Boehler
(74) *Attorney, Agent, or Firm*—Vorys, Sater, Seymour, Pease; William H. Oldach, III; Corinne Marie Pouliquen

(57) ABSTRACT

A plurality of trailer arrangements, configurations and assemblies are provided in combination with a tractor to transport wheeled vehicles over the highway, in compliance with current state and federal regulatory requirements and with a view toward future modification of those requirements.

18 Claims, 2 Drawing Sheets

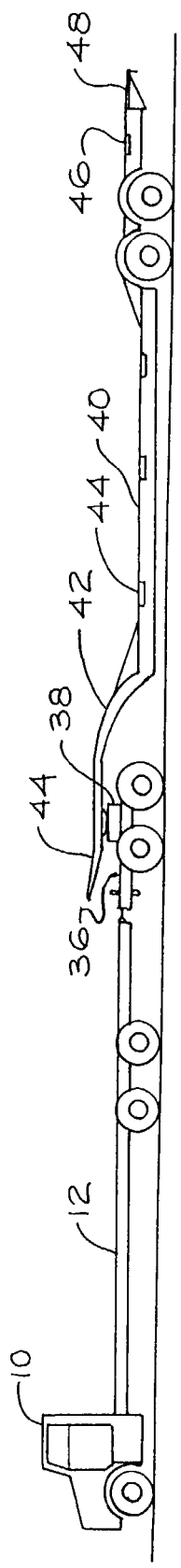
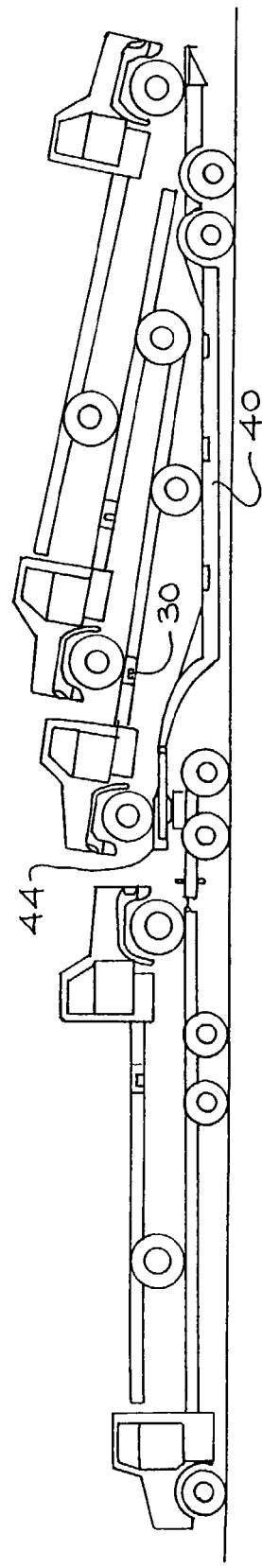

TRAILER APPARATUS AND ASSEMBLY FOR TRANSPORTATION OF WHEELED VEHICLES

This application is a continuation of and claim priority benefit from U.S. application Ser. No. 09/743,557 now abandoned, filed May 11, 2001 and PCT Application No. PCT/US99/15523 filed date Jul. 9, 1999 which was a continuation in part of U.S. application Ser. No. 09/113,804 filed Jul. 9, 1998 now abandoned, each of which is incorporated herein in its entirety.

BACKGROUND OF THE INVENTION

The present invention relates generally to trailer apparatus typically transported over the highway, pulled by tractor vehicles. In particular, the invention relates to over the highway trailers and related assemblies configured and arranged for the transportation of trucks and truck chassis, all the while meeting various industry standards and complying with state and federal highway, transportation and related regulatory requirements.

Trucks can be transported to a delivery site by using one of the trucks to tow the others. In such an arrangement, the towing truck has a saddle arrangement on which the first towed truck can be mounted. The first towed truck, in turn, also has a saddle arrangement by which a second towed truck can be mounted. Typically, the axle of each towed truck is coupled to the corresponding saddle arrangement on the truck towed before it. Any frame member of a towed truck can also be used to accomplish the same purpose.

Such a decking arrangement has associated with it, however, a number of problems and deficiencies. The number or size of the towed trucks is limited by existing state and federal regulations. Handling problems abound as the number of towed trucks and/or chassis lengths increase.

SUMMARY OF THE INVENTION

This invention provides a trailer apparatus and/or assembly for the transportation of wheeled vehicles. The invention overcomes certain well-known problems and deficiencies, but also with a view toward future revisions to the regulated transport of such vehicles.

Accordingly, it is an object of the present invention to provide a trailer suitable for the transportation of extended length truck chassis. A corollary objective is to provide such a trailer and/or assembly for the transportation of wheeled vehicles in a number or having an overall length which exceeds existing regulatory standards.

It will be understood by those skilled in the art one or more aspects of this invention can meet certain objectives, while one or more other aspects can meet certain other objectives. Each objective may not apply equally, in all instances, to every aspect of the present invention. In this regard, the aforementioned objects—as well as those aspects and features which follow—can be viewed in the alternative with respect to any one aspect of the present invention.

Other objects, features and advantages of the present invention will be apparent from the following to those skilled in the art having knowledge of the design and manufacture of truck transportation trailers. Such objects, features, benefits and advantages will be apparent from the above as taken in conjunction with the accompanying figures, data and all reasonable inferences to be drawn therefrom.

BRIEF DESCRIPTION OF THE DRAWINGS

FIG. 3 is a schematic representation of a trailer and/or assembly, in accordance with this invention.

FIG. 4 shows the trailer/assembly of FIG. 3 loaded with a number of extended chassis trucks.

DETAILED DESCRIPTION OF PREFERRED EMBODIMENTS

Figure 1:
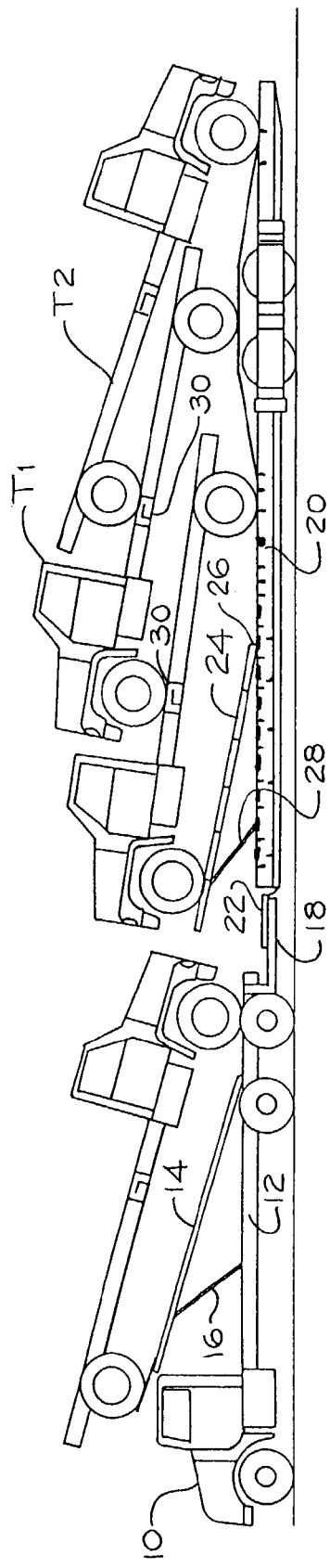
FIG. 1 is a schematic representation of a trailer and/or assembly depicted, in accordance with this invention, as hauling a number of trucks.

Referring to FIG. 1, tractor 10 is shown with bed 12 on which pivots ramp 14. Bed ramp 14 is positioned relative to bed 12 with elevator 16. In preferred embodiments, elevator 16 is a component of a hydraulic mechanism secured to bed 12 and movable along a length of ramp 14. Ramp 14 can conform to the surface structure of bed 12 when elevator 16 is retracted.

Bed extender 18 can be used to attach bed 12 to trailer 20. A coupling mechanism 22 includes corresponding components of extender 18 and trailer 20. In preferred embodiments, such a component of extender 18 is a fifth wheel assembly, which can couple to a corresponding component of trailer 20.

Trailer ramp 24 is connected to trailer 20 at pivot 26. Ramp 24 can be elevated and positioned relative to trailer 20 by way of elevator 28. In preferred embodiments, elevator 28 is a hydraulic mechanism secured to bed 20 and moveable along a length of ramp 24. Ramp 24 can conform to the surface of structure of trailer 20 when elevator 28 is retracted.

FIG. 1 also shows, schematically, bed 12 and trailer 20 loaded with truck chassis. Using mechanisms well-known to those skilled in the art, the chassis are either secured to the bed or trailer ramps and/or one to another. Various coupling or saddle mechanisms 30, including those of the sort described in U.S. Pat. No. 5,722,677, incorporated herein by reference in its entirety, can be utilized effectively. Such mechanisms can also include skid mounts of the type known to those skilled in the art. Such mechanisms can be, as illustrated in FIG. 1, secured to an underlying truck chassis $T_1$, to couple chassis $T_2$ therewith. Positioning chassis $T_2$ on chassis $T_1$, can be accomplished using auxiliary skids as, likewise, would be well known to those skilled in the art and made aware of this invention. The present invention also contemplates use of rigid supports in conjunction with elevators 16 and/or 28. Such supports can have a linear configuration corresponding to the elevators shown and be placed adjacent thereto prior to loading.

Figure 2:
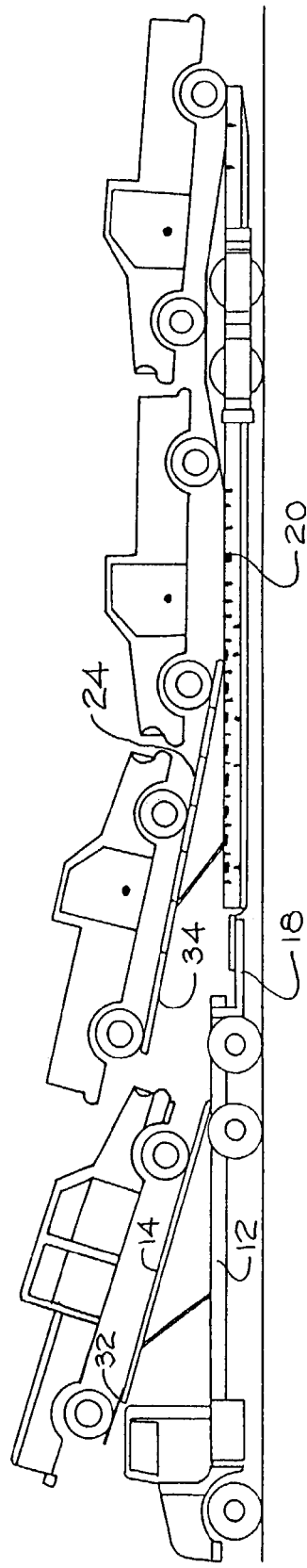
FIG. 2 is another representation showing, in particular, a trailer and/or assembly with ramp extension members.

FIG. 2 shows another embodiment of the trailer and/or assembly of FIG. 1. In particular, bed ramp 14 can be lengthened with bed ramp extension member 32. In a similar fashion, trailer ramp 24 can be lengthened using trailer ramp extension member 34. Various mechanical mechanisms can be used effectively to lengthen each respective ramp. In preferred embodiments, each extension member has a telescopic relationship and operation relative to the respective ramp. Likewise, in preferred embodiments each ramp can be thereby extended hydraulically.

While not shown in FIG. 2, the present invention contemplates an assembly including ramp 24 and extension member 34 positioned relative to bed 12 and trailer 20 such that wheeled access is provided to bed 12 from trailer 20. In preferred embodiments, extension member 34 can be secured to the rear surface portion of bed 12 to permit such wheeled access.

Preferred embodiments of the assemblies shown in FIGS. 1 and 2 provide a length of about 75 feet, as measured from the front end of tractor 10 to the rear end of trailer 20. While standard tractor and bed assemblies can be used effectively, a preferred trailer embodiment has a length of about 34 feet, as measured from the rear wheel axle of trailer 20 to coupling mechanism 22. Preferably, in such embodiments, bed extender 18 has a length of about 60 inches, as measured from the rear wheel axle of tractor 10 to coupling mechanism 22. As shown in both FIGS. 1 and 2, the trucks loaded on trailer 20 extend past the rear portion thereof at a permissible distance in compliance with applicable regulations. As shown in FIGS. 3 and 4, and more fully discussed below, the trailer component of this invention can be used in conjunction with retractable rear extension 48, a preferred embodiment of which can be positioned within supporting framework of such a trailer when not used to extend the effective length thereof.

As best shown in FIG. 3, the present invention also includes, in part, connector 36 coupling tractor bed 12 and trailer 40. In preferred embodiments, connector 36 further includes fifth wheel assembly 38. Other coupling mechanisms well-known to those skilled in the art can also be used effectively. Such connectors and related assemblies include but are not limited to those described in U.S. Pat. No. 5,326,123 which is incorporated herein in its entirety. Likewise, in preferred embodiments, connector 36 can assist in steering and/or the directional control and stability of trailer 40. Those skilled in the art would refer to a stinger-steered trailer as one having such an embodiment of connector 36 used in conjunction with trailer 40.

Regardless, trailer 40 is extended with gooseneck 42, which terminates with end portion 44. Adjustment of the angular relationship of end portion 44 with gooseneck 42 imparts an increment of stability with relationship to any truck or chassis loaded onto gooseneck 42. Alternatively, as shown in FIG. 4, end portion 44 can be positioned on gooseneck 42 and used secure a loaded truck thereon. As shown schematically in FIG. 3, securing members 46 can be incorporated into the frame of trailer 40 to further secure the position of trucks and chassis thereon. One embodiment of such a member, as would be well-known to those skilled in the art, can comprise a tie hole for placement of a chain other fastener therethrough.

With reference to the embodiments illustrated by FIGS. 3 and 4, the overall length of such an assembly can be up to about and beyond 95 feet, as measured from the front end of tractor 10 to the rear end of trailer 40. While any commercially-available tractor/bed combination can be used, a preferred tractor is one having a length of about 32 feet, as measured from the front end of tractor 10 to the rear wheel axle of trailer 12. With such a tractor/bed combination, trailer 40 can have a length of about 46 feet, as measured from the point of coupling with connector 36.

With respect to either a trailer or an assembly of the present invention, the connectors, tractor beds, trailers and/or ramps and related mechanisms can suitably comprise, consist of, or consist essentially of the aforementioned components. Each such component is distinguishable, characteristically contrasted and can be practiced in conjunction with the present invention separate and apart from another. Accordingly, it should also be understood that the inventive trailers and/or assemblies, as illustratively disclosed herein, can be practiced or utilized in the absence of any one component which may or may not be disclosed, referenced or inferred herein, the absence of which may or may not be specifically disclosed, referenced or inferred herein.

While the principles of this invention have been described in connection with the specific embodiments, it should be understood clearly that these descriptions, along with the chosen figures and data referenced therewith, are made only by way of example and are not intended to limit the scope of this invention, in any manner. Other advantages and features of the invention will become apparent from the following claims, with the scope thereof determined by the reasonable equivalents, as understood by those skilled in the art.

What is claimed is:

1. An apparatus for compactly transporting a plurality of trucks, said apparatus comprising in combination:
   a.) a truck tractor including a horizontal rearward bed for supporting at least a first truck of said plurality of trucks, said rearward bed including:
      a first ramp for supporting at least a portion of said first truck of said plurality of trucks and a first extension member for projecting from said first ramp and hydraulically retractable relative to said first ramp; and
      a first retractable elevator for moving said first ramp between a raised position and a lowered position, said first ramp substantially conforming to a surface of said rearward bed when said first retractable elevator is in said lowered position;
   b.) a trailer supporting said plurality of trucks, said trailer including:
      a second ramp for supporting at least a portion of a second truck of said plurality of trucks and a second extension member for projecting from said second ramp and hydraulically retractable relative to said second ramp; and
      a second retractable elevator for moving said second ramp between a raised position and a lowered position, said second ramp substantially conforming to said trailer when said second retractable elevator is in said lowered position; and
      a retractable rear extension; and
   c.) a bed extender for coupling said truck tractor to said trailer;
   wherein at least a portion of said second truck of said plurality of trucks is supported by said second ramp, and wherein a third truck is partially supported by the second truck and partially supported by the trailer.

2. The apparatus as set forth in claim 1, wherein said first retractable elevator and said second retractable elevator include a first hydraulic mechanism and a second hydraulic mechanism, respectively.

3. The apparatus as set forth in claim 1, wherein said trailer is of sufficient length to support at least said second truck, said third truck and a fourth truck.

4. The apparatus as set forth in claim 3, wherein at least a portion of said second truck is supported by said second ramp, and wherein said third truck and said fourth truck are secured to said trailer.

5. The apparatus as set forth in claim 3, wherein at least a portion of said second truck is secured to said second ramp, at least a portion of said third truck is secured to said second truck, and at least a portion of said fourth truck is secured to said third truck, said second truck, third truck and fourth truck being secured in a partially stacked and partially overlapping relationship with one another.

6. The apparatus as set forth in claim 1, wherein said second extension member is of sufficient length to provide wheeled access to said rearward bed when said second retractable elevator is in a retracted position that substantially bridges said second ramp and said second extension member to said rearward bed.

7. The apparatus as set forth in claim 6, wherein said second extension member is securable to said rearward bed to provide wheelable access to said rearward bed to allow movement of one of said plurality of trucks between said trailer and said rearward bed.

8. The apparatus as set forth in claim 1, wherein said bed extender comprises a fifth wheel assembly.

9. The apparatus of claim 1, wherein the retractable rear extension is configured for positioning within the trailer when not in use as an extension.

10. An apparatus for compactly transporting a plurality of trucks, said apparatus comprising in combination:
   a.) a truck tractor including a horizontal rearward bed for supporting at least a first truck of said plurality of trucks, said rearward bed including:
      a first ramp for supporting at least a portion of said first truck of said plurality of trucks;
      a first retractable elevator for moving said first ramp between a raised position and a lowered position, said first ramp substantially conforming to a surface of said rearward bed when said first retractable elevator is in said lowered position; and
      a first extension member projecting from said first ramp;
   b.) a trailer supporting said plurality of trucks, said trailer including:
      a second ramp for supporting at least a portion of a second truck of said plurality of trucks;
      a second retractable elevator for moving said second ramp between a raised position and a lowered position, said second ramp substantially conforming to said trailer when said second retractable elevator is in said lowered position; and
      a retractable rear extension; and
      a second extension member projecting from said second ramp, wherein said second extension member is of sufficient length to provide wheeled access to said rearward bed when said second retractable elevator is in a retracted position that substantially bridges said second ramp and said second extension member to said rearward bed; and
   c.) a bed extender for coupling said truck tractor to said trailer;
      wherein at least a portion of said second truck of said plurality of trucks is supported by said second ramp, and wherein a third truck is partially supported by the second truck and partially supported by the trailer.

11. The apparatus as set forth in claim 10, wherein said first extension member and said second extension member are hydraulically retractable relative to said first ramp and said second ramp, respectively.

12. The apparatus as set forth in claim 10, wherein said first retractable elevator and said second retractable elevator include a first hydraulic mechanism and a second hydraulic mechanism, respectively.

13. The apparatus as set forth in claim 10, wherein said trailer is of sufficient length to support at least said second truck, said third truck and a fourth truck.

14. The apparatus of claim 10, wherein the retractable rear extension is configured for positioning within the trailer when not in use as an extension.

15. An apparatus for compactly transporting a plurality of trucks, said apparatus comprising in combination:
   a.) a truck tractor including a horizontal rearward bed for supporting at least a first truck of said plurality of trucks, said rearward bed including:
      a first ramp for supporting at least a portion of said first truck of said plurality of trucks, said first ramp being pivotally connected to said truck tractor and a first extension member for projecting from said first ramp, said first extension member hydraulically retractable relative to said first ramp; and
      a first retractable elevator for moving said first ramp between a raised position and a lowered position, said first ramp substantially conforming to a surface of said rearward bed when said first retractable elevator is in said lowered position, said first retractable elevator including a first hydraulic mechanism;
   b.) a trailer supporting said plurality of trucks, said trailer comprising:
      a second ramp for supporting at least a portion of said second truck of said plurality of trucks, said second ramp being pivotally connected to said trailer and a second extension member for projecting from said second ramp, said second extension member hydraulically retractable relative to said second ramp, said second extension member having sufficient length to provide wheeled access to said rearward bed when said second retractable elevator is in a retracted position that substantially bridges said second ramp and said second extension member to said rearward bed;
      a second retractable elevator for moving said second ramp between a raised position and a lowered position, said second ramp substantially conforming to said trailer when said second retractable elevator is in said lowered position, said second retractable elevator including a second hydraulic mechanism; and
      said trailer is of sufficient length to support at least a second truck, a third truck and a fourth truck, wherein at least a portion of said second truck is supported by said second ramp, and wherein said third truck and said fourth truck are secured to said trailer; and
      a retractable rear extension; and
   c.) a bed extender for coupling said truck tractor to said trailer, wherein said bed extender comprises a fifth wheel assembly;
      wherein at least a portion of said second truck of said plurality of trucks is supported by said second ramp, and wherein said third truck is partially supported by the second truck and partially supported by the trailer.

16. The apparatus as set forth in claim 15, wherein at least a portion of said fourth truck is secured to said third truck, said second truck, third truck and fourth truck being secured in a partially stacked and partially overlapping relationship with one another.

17. The apparatus of claim 15, wherein said second extension member is securable to said rearward bed to provide wheelable access to said rearward bed to allow movement of one of said plurality of trucks between said trailer and said rearward bed.

18. The apparatus of claim 15, wherein the retractable rear extension is configured for positioning within the trailer when not in use as an extension.

* * * * *